US011070736B2

(12) United States Patent
Lee et al.

(10) Patent No.: US 11,070,736 B2
(45) Date of Patent: Jul. 20, 2021

(54) ELECTRONIC DEVICE AND IMAGE PROCESSING METHOD THEREOF

(71) Applicant: Samsung Electronics Co., Ltd., Gyeonggi-do (KR)

(72) Inventors: Gyubong Lee, Gyeonggi-do (KR); Jeongyong Park, Gyeonggi-do (KR); Jungsoo Shin, Seoul (KR); Hyoungjin Yoo, Gyeonggi-do (KR); Wooyong Lee, Gyeonggi-do (KR); Inpyo Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/498,809

(22) PCT Filed: Mar. 27, 2018

(86) PCT No.: PCT/KR2018/003591
§ 371 (c)(1),
(2) Date: Sep. 27, 2019

(87) PCT Pub. No.: WO2018/182282
PCT Pub. Date: Oct. 4, 2018

(65) Prior Publication Data
US 2020/0036883 A1 Jan. 30, 2020

(30) Foreign Application Priority Data
Mar. 27, 2017 (KR) .................. 10-2017-0038452

(51) Int. Cl.
*H04N 5/235* (2006.01)
*H04N 5/232* (2006.01)
*H04N 5/345* (2011.01)

(52) U.S. Cl.
CPC ....... *H04N 5/2353* (2013.01); *H04N 5/23251* (2013.01); *H04N 5/345* (2013.01)

(58) Field of Classification Search
CPC .. H04N 5/2353; H04N 5/23251; H04N 5/345; H04N 5/351; H04N 5/353;
(Continued)

(56) References Cited

U.S. PATENT DOCUMENTS

| 6,639,626 B1 * | 10/2003 | Kubo ................... H04N 5/2258 348/218.1 |
| 2008/0211941 A1 * | 9/2008 | Deever ................ H04N 5/2353 348/262 |

(Continued)

FOREIGN PATENT DOCUMENTS

| JP | 2010166304 | 7/2010 |
| JP | 5136664 | 2/2013 |

(Continued)

OTHER PUBLICATIONS

PCT/ISA/210 Search Report issued on PCT/KR2018/003591, pp. 5.
PCT/ISA/237 Written Opinion issued on PCT/KR2017/003591, pp. 5.

*Primary Examiner* — Jason A Flohre
(74) *Attorney, Agent, or Firm* — The Farrell Law Firm, P.C.

(57) ABSTRACT

An electronic device according to various embodiments of the present invention comprises a camera module and a processor, wherein the processor may: receive a signal related to photographing; acquire, in response to the signal, by taking a single photograph, a first image related to a first exposure time and a second image related to a second exposure time shorter than the first exposure time, through the camera module; compare at least one pixel included in the first image and at least one pixel included in the second image, which corresponds to the at least one pixel included in the first image; divide the at least one pixel included in the second image into a first group and a second group, on the basis of a result of the comparison; determine one of the first
(Continued)

group and the second group; and process at least one pixel included in the determined group. In addition, various embodiments are possible.

11 Claims, 18 Drawing Sheets

(58) Field of Classification Search
CPC ........... H04N 5/23258; H04N 5/23254; H04N 5/23216; H04N 5/232
See application file for complete search history.

(56) References Cited

U.S. PATENT DOCUMENTS

| | | | |
|---|---|---|---|
| 2009/0219415 A1 | 9/2009 | Matsunaga et al. | |
| 2010/0053346 A1* | 3/2010 | Mitsunaga | H04N 5/23254 348/208.6 |
| 2012/0008015 A1 | 1/2012 | Manabe | |
| 2012/0177352 A1* | 7/2012 | Pillman | H04N 5/2354 396/61 |
| 2012/0274822 A1* | 11/2012 | Smith | H04N 5/35554 348/302 |
| 2013/0265484 A1* | 10/2013 | Hasegawa | H04N 5/23219 348/349 |
| 2014/0078320 A1* | 3/2014 | Hong | H04N 5/217 348/208.1 |
| 2014/0184852 A1 | 7/2014 | Niemi et al. | |
| 2014/0198226 A1* | 7/2014 | Lee | H04N 5/23254 348/208.1 |
| 2016/0112620 A1* | 4/2016 | Mine | H04N 5/2351 348/234 |
| 2016/0301868 A1 | 10/2016 | Acharya et al. | |
| 2017/0041542 A1* | 2/2017 | Ono | H04N 5/23254 |
| 2017/0214838 A1* | 7/2017 | Miyazawa | H04N 5/23287 |

FOREIGN PATENT DOCUMENTS

| | | |
|---|---|---|
| KR | 101062502 | 8/2011 |
| KR | 101573131 | 11/2015 |
| KR | 20160143138 | 12/2016 |

* cited by examiner

LONG EXPOSURE ELEMENT (810)

SHORT EXPOSURE ELEMENT (820)

800

LONG EXPOSURE ELEMENT (810)

SHORT EXPOSURE ELEMENT (820)

ELECTRONIC DEVICE AND IMAGE PROCESSING METHOD THEREOF

PRIORITY

This application is a National Phase Entry of PCT International Application No. PCT/KR2018/003591 which was filed on Mar. 27, 2018, and claims priority to Korean Patent Application No. 10-2017-0038452, which was filed on Mar. 27, 2017, the content of each of which is incorporated herein by reference.

TECHNICAL FIELD

Various embodiments of the disclosure relate to an electronic device and a method of processing an image thereof, and relate to a device and method for processing at least one image using two or more images obtained by one photographing, for example.

BACKGROUND ART

With the recent development of the technology, electronic devices supporting various user functions, such as smart phones and tablet personal computers (PCs), are released. Such an electronic device may provide a user with various functions related to a camera module by including the camera module.

DISCLOSURE OF INVENTION

Technical Problem

As the supply of an electronic device including a camera module is expanded, a user's needs to apply various effects to an image obtained through the camera module are increasing. For example, in general, if an image having a panning shot effect is to be obtained, an image having a panning shot effect may be obtained by photographing the subject in such a manner that an electronic device whose exposure time of a camera module is lengthily set is moved in accordance with the speed of the moving subject. In this case, the panning shot may mean a photographing method or effect in which the moving subject stands out by clearly expressing the moving subject as if it is stopped and blurredly expressing the background.

For example, if the subject is photographed by moving the electronic device in accordance with the speed of the moving subject, a user may feel inconvenient because he or she has to move the electronic device in accordance with the speed of the subject. If the electronic device is shaken by a user's motion (e.g., hand shaking), there is a problem in that it is difficult for the user to obtain a required image.

An image having a panning shot effect may be obtained by contiguously photographing a moving subject at given time intervals. For example, whether an object included in an image is an object corresponding to the subject or an object corresponding to the background may be identified by calculating a motion vector between the locations of the subjects included in a plurality of images. An image having a panning shot effect may be obtained by processing the image so that the panning shot effect is applied to an object corresponding to the subject or an object corresponding to the background.

For example, if a moving subject is contiguously photographed at given time intervals, it is difficult to exactly identify whether an object is an object corresponding to the subject because the location of an object corresponding to the subject is different in each image. Furthermore, a long time is taken because the subject is continuously photographed at given time intervals. In this case, if an electronic device is shaken by a user's motion, there is a problem in that it is difficult for the user to obtain a required image.

Solution to Problem

According to an embodiment of the disclosure, an electronic device includes a camera module and a processor. The processor may be configured to obtain a signal related to photographing, obtain a first image related to a first exposure time and a second image related to a second exposure time shorter than the first exposure time by one photographing through the camera module in response to the signal, compare at least one pixel included in the first image with at least one pixel included in the second image and corresponding to the at least one pixel included in the first image, divide the at least one pixel included in the second image into a first group and a second group based on a result of the comparison, identify any one of the first group and the second group, and process at least one pixel included in the identified group.

According to an embodiment of the disclosure, an image processing method of an electronic device may include receiving a signal related to photographing, obtaining a first image related to a first exposure time and a second image related to a second exposure time shorter than the first exposure time by one photographing through the camera module in response to the signal, comparing at least one pixel included in the first image with at least one pixel included in the second image and corresponding to the at least one pixel included in the first image, dividing the at least one pixel included in the second image into a first group and a second group based on a result of the comparison, identifying any one of the first group and the second group, and processing at least one pixel included in the identified group.

Advantageous Effects of Invention

The electronic device and the method of processing an image thereof according to various embodiments of the disclosure can provide an image to which various image effects of high quality have been applied using a plurality of images obtained by one photographing.

MODE FOR THE INVENTION

Figure 1:
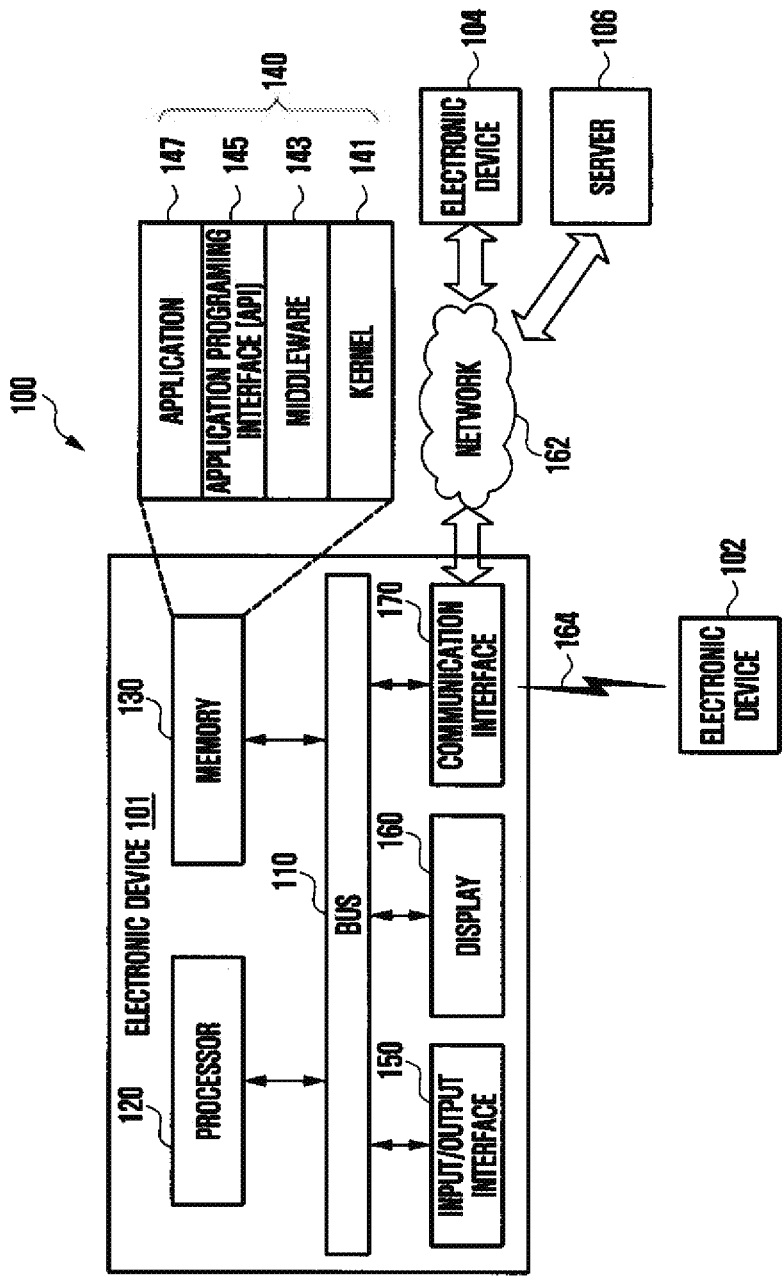
FIG. 1 is a block diagram showing a network environment including an electronic device according to various embodiments of the disclosure.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in the disclosure and does not exclude presence or addition of at least one other characteristic, numeral, step, operation, element, component, or combination thereof. Terms used in the present disclosure are not to limit the present disclosure but to illustrate example embodiments. When using in a description of the present disclosure and the appended claims, a singular form includes a plurality of forms unless it is explicitly differently represented. Unless differently defined, entire terms including a technical term and a scientific term used here have the same meaning as a meaning that may be generally understood by a person of common skill in the art. It should be understood that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic accessory, or a smart watch), or the like, but is not limited thereto. According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, or the like, but is not limited thereto. According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.), or the like, but is not limited thereto. An electronic device disclosed herein may be one of the above-mentioned devices or any combination thereof. As well understood by those skilled in the art, the above-mentioned electronic devices are examples only and not to be considered as a limitation of this disclosure.

FIG. 1 is a block diagram illustrating an example electronic apparatus in a network environment according to an example embodiment of the present disclosure. Referring to FIG. 1, the electronic apparatus 101 may include a bus 110, a processor (e.g., including processing circuitry) 120, a memory 130, an input/output interface (e.g., including input/output circuitry) 150, a display 160, and a communication interface (e.g., including communication circuitry) 170. The bus 110 may be a circuit for interconnecting elements described above and for allowing a communication, e.g. by transferring a control message, between the elements described above. The processor 120 can receive commands from the above-mentioned other elements, e.g. the memory 130, the input/output interface 150, the display 160, and the communication interface 170, through, for example, the bus 110, can decipher the received commands, and perform operations and/or data processing according to the deciphered commands.

The memory 130 can store commands received from the processor 120 and/or other elements, e.g. the input/output interface 150, the display 160, and the communication interface 170, and/or commands and/or data generated by the processor 120 and/or other elements. The memory 130 may include softwares and/or programs 140, such as a kernel 141, middleware 143, an Application Programming Interface (API) 145, and an application 147. Each of the programming modules described above may be configured of software, firmware, hardware, and/or combinations of two or more thereof. The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 performs a relay function which allows the API 145 and/or the application 147 to communicate with and exchange data with the kernel 141. Further, in relation to operation requests received from at least one of the application 147, the middleware 143 performs load balancing in relation to the operation requests by, for example, giving a priority in using a system resource, e.g. the bus 110, the processor 120, and/or the memory 130, of the electronic device 101 to at least one of the application 147. The API 145 is an interface through which the application 147 controls a function provided by the kernel 141 and/or the middleware 143, and may include at least one interface or function for file control, window control, image processing, and/or character control. The input/output interface 150 receives a command and/or data from a user, and transfers the received command and/or data to the processor 120 and/or the memory 130 through the bus 110. The display 160 can display an image, a video, and/or data to a user.

The display 160 includes a liquid crystal display (LCD), a flexible display, a transparent display, a light emitting diode (LED) display, an organic light emitting diode (OLED) display, an active matrix-OLED (AM-OLED) display, a micro-electro-mechanical systems (MEMS) display, an electronic paper display, etc. The display 160 displays various types of content (e.g., texts, images, videos, icons, symbols, etc.). The display 160 may also be implemented with a touch screen. In this case, the display 160 receives touches, gestures, proximity inputs or hovering inputs, via a stylus pen, or a user's body.

The communication interface 170 establishes a communication between the electronic device 101 and an external device, such as a first external electronic device 102, a second external electronic device 104, and/or a server 164.

For example, the communication interface 170 communicates with the first external electronic device 102 via short-range communication 164 and communicates with the second external electronic device 104 and the server 106 connected to a network 162 via wired or wireless communication Wireless communication may include long-term evolution (LTE), LTE advance (LTE-A), code division multiple access (CDMA), wideband CDMA (WCDMA), universal mobile telecommunications system (UMTS), Wireless Broadband (WiBro), and global system for mobile communication (GSM). Wireless communication may also include the short-wireless communication 164. Short-wireless communication 164 may include WiFi, Bluetooth (BT), and near field communication (NFC) protocol, magnetic secure transmission (MST), and global navigation satellite system (GNSS). The GNSS may include at least one of global positioning system (GPS), global navigation satellite system (Glonass), Beidou navigation satellite system (Beidou, Galileo, the European global satellite-based navigation system, according to GNSS using areas, bandwidths, etc. Wired communication may include universal serial bus (USB), high definition multimedia interface (HDMI), recommended standard 232 (RS-232), and plain old telephone service (POTS). The network 162 may include, the Internet, a local area network (LAN), a Wide area network (WAN), a telecommunication network, a cellular network, a satellite network, or any other similar and/or suitable communication networks.

Each of the first and second external electronic devices 102 and 104 may be of the same type or of a different type than the electronic device 101. According to various embodiments of the present disclosure, all or part of operations executed in the electronic device 101 may be executed in another or a plurality of electronic devices (for example, the electronic devices 102 and 104 or the server 106). According to this, when the electronic device 101 needs to perform a function or service automatically or by request, the electronic device 101 may instead execute or execute the function or service by itself, or at least some function associated therewith. May be requested to another device (e.g., the electronic device 102 and 104 or the server 106.) The other electronic device (e.g., the electronic devices 102 and 104 or the server 106) may request the requested function or The additional function may be executed and the result may be transmitted to the electronic device 101. The electronic device 101 may provide the requested function or service by processing the received result as it is or additionally. For Cloud computing, distributed computing, or client-server computing techniques can be used.

Figure 2:
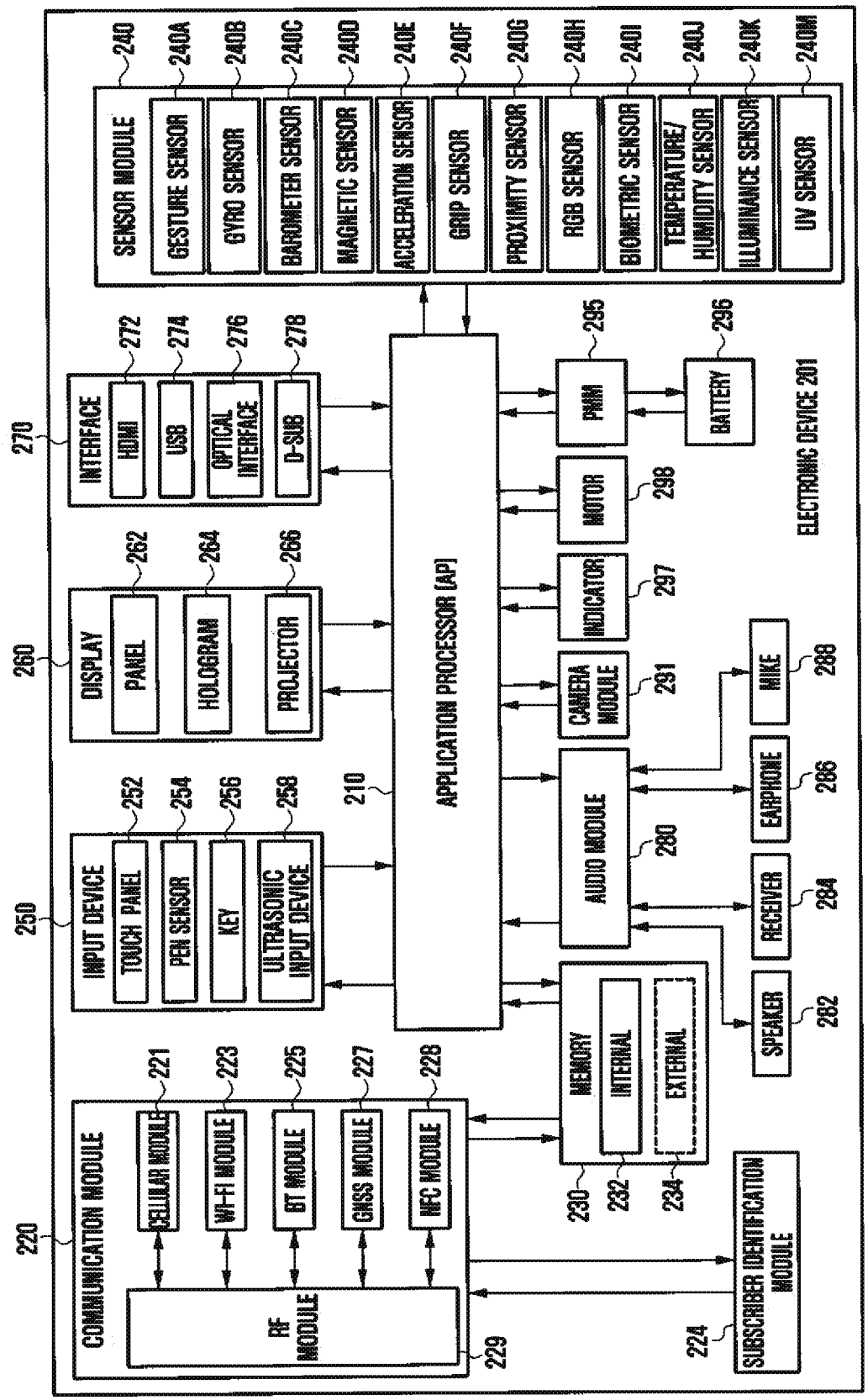
FIG. 2 is a block diagram of an electronic device according to various embodiments of the disclosure.

FIG. 2 is a block diagram illustrating an example electronic device 201 in accordance with an example embodiment of the present disclosure. The electronic device 201 may form, for example, the whole or part of the electronic device 101 shown in FIG. 1. Referring to FIG. 2, the electronic device 201 may include at least one application processor (AP) (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298. The AP 210 may include various processing circuitry, and drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 101 (e.g., the electronic device 201) through the network. According to an embodiment, the communication module 220 may include various communication circuitry, such as, for example, and without limitation, a cellular module 221, a WiFi module 223, a BT module 225, a GPS module 227, an NFC module 228, and an RF (Radio Frequency) module 229. The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function. According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment. According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory. Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC. The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment. The SIM card 224 may be a specific card formed of SIM and may be inserted into a slot formed at a certain place of the electronic device 201. The SIM card 224 may contain therein an ICCID (Integrated Circuit Card IDentifier) or an IMSI (International Mobile Subscriber Identity).

The memory 230 (e.g., the memory 230) may include an internal memory 232 and/or an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric (e.g., barometer) sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination (e.g., illuminance/light) sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input device 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user. The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (e.g., the display 250) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266. The interface 270 may include various interface circuitry, such as, for example, and without limitation, an HDMI (High-Definition Multimedia Interface) 272, a USB (Universal Serial Bus) 274, an optical interface 276, or a D-sub (D-subminiature) 278. The interface 270 may be contained, for example, in the communication interface 260 shown in FIG. 2. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The image sensor included in the camera module 291 may, for example, detect photons of light received through the lens and convert the photon into an electrical signal. For example, the camera module 291 may include an image sensor in which photodiodes for detecting light and generating charges are arranged in one or two dimensions. On the other hand, the processor 210 independently of each device, for example, the time (hereinafter, "exposure time") that the device corresponding to each pixel of the image included in the image sensor is exposed to light. may also be set.

The camera module 291 may include two or more lenses, for example. For example, when the first lens is disposed on the front surface of the electronic device, the second lens may be disposed on the rear surface of the electronic device. Alternatively, the first lens may be disposed on the same surface as the front or rear surface of the electronic device on which the second lens is disposed. On the other hand, for example, light received through the first lens may be detected through the first image sensor, and light received through the second lens may be detected through the second image sensor. In the meantime, when the processor 210 includes two or more image sensors, the processor 210 may independently set the exposure time of each image sensor.

The power management module 295 may manage electric power of the electronic device 201. Although not shown, the power management module 295 may include, for example, a PMIC (Power Management Integrated Circuit), a charger IC, or a battery or fuel gauge. The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier. The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of DMB (Digital Multimedia Broadcasting), DVB (Digital Video Broadcasting), or media flow. Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of a dedicated processor, a CPU, an ASIC (Application-Specific Integrated Circuit) chip, FPGAs (Field-Programmable Gate Arrays), and programmable-logic device, which have been known or are to be developed.

Figure 3:
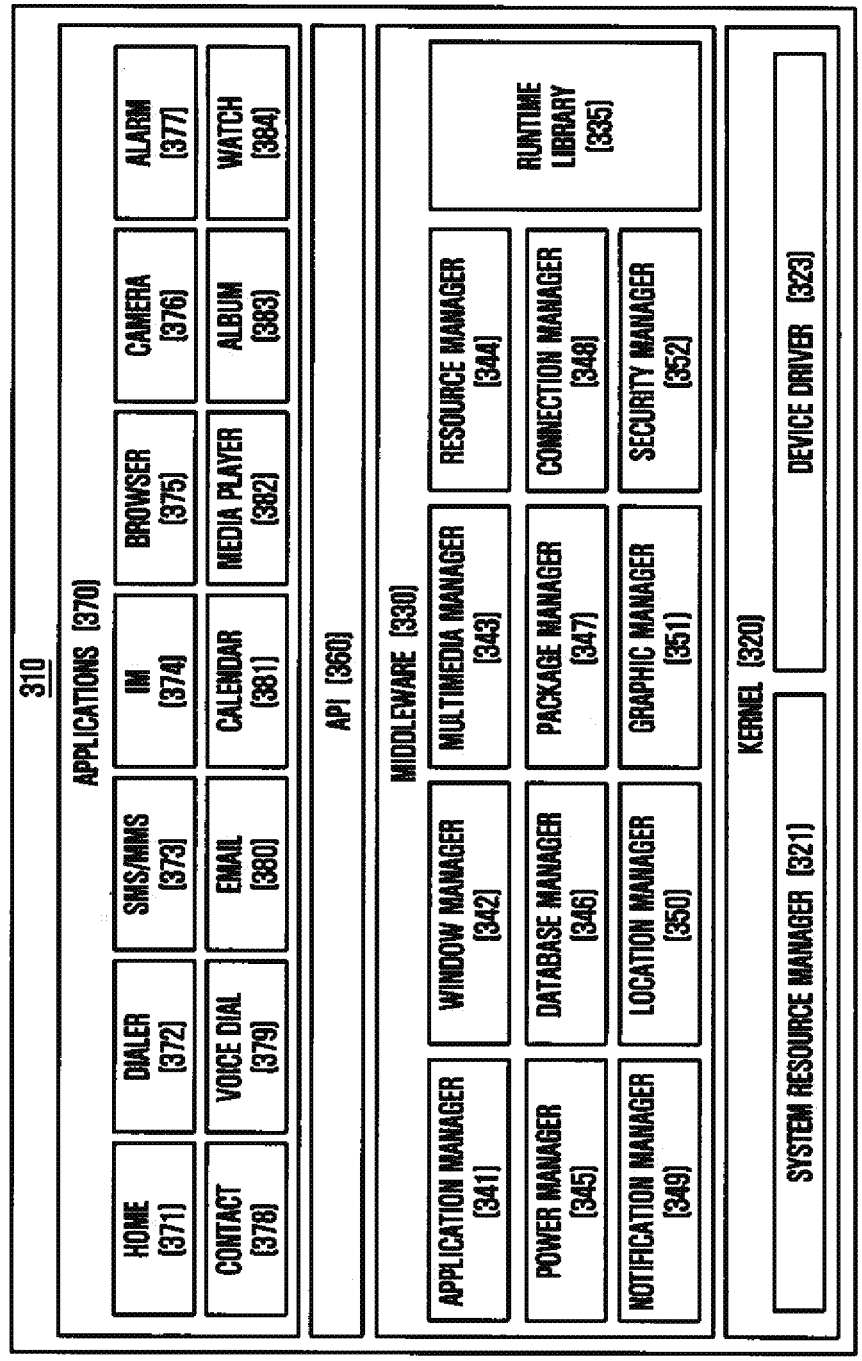
FIG. 3 is a block diagram of a program module according to various embodiments of the disclosure.

FIG. 3 is a block diagram illustrating an example configuration of a programming module 310 according to an example embodiment of the present disclosure. The programming module 310 may be included (or stored) in the electronic device 201 (e.g., the memory 230) illustrated in FIG. 2 or may be included (or stored) in the electronic device 101 (e.g., the memory 130) illustrated in FIG. 1. At least a part to of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be Android, iOS, Windows, Symbian, Tizen, Bada, and the like. Referring to FIG. 3, the programming module 310 may include a kernel 320, a middleware 330, an API 360, and/or the application 370.

The kernel 320 (e.g., the kernel 141) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an Inter-Process Communication (IPC) driver (not illustrated). As one of various embodiments of the present disclosure, the display driver may control at least one display driver IC (DDI). The display driver may include the functions for controlling the screen according to the request of the application 370. The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like. The application manager 341 may manage, for example, a life cycle of at least one of the applications 370. The window manager 342 may manage GUI resources used on the screen. For example, when at least two displays 260 are connected, the screen may be differently configured or managed in response to the ratio of the screen or the action of the application 370. The multimedia manager 343 may detect a format used to reproduce various media files and may encode or decode a media file through a codec appropriate for the relevant format. The resource manager 344 may manage resources, such as a source code, a memory, a storage space, and/or the like of at lost one of the applications 370. The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 201) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name. The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

The term "module" used herein may refer to a unit that includes hardware, software, firmware, or any combination thereof. The module may be interchangeably used with the term unit, logic, logical block, component, or circuit. The module may be the minimum unit, or part thereof, which performs one or more particular functions. The module may be formed mechanically or electronically. For example, the module disclosed herein may include at least one of an application-specific integrated circuit (ASIC) chip, a field-programmable gate array (FPGA), and a programmable-logic device, which have been known or are to be developed.

Figure 4:
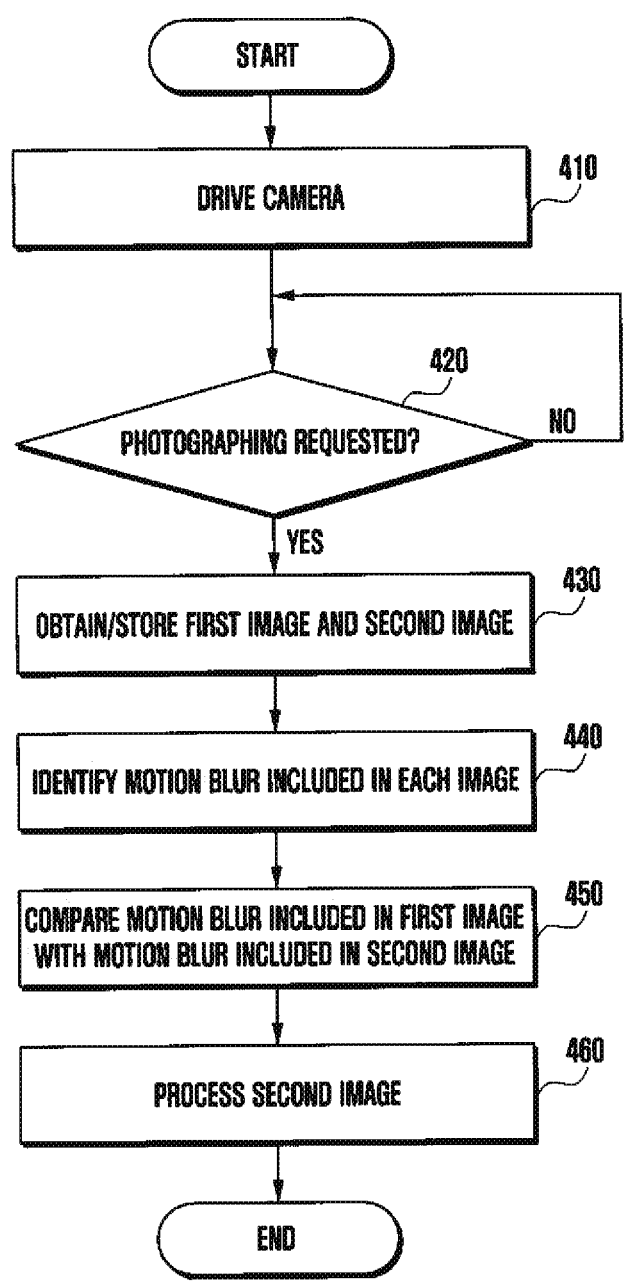
FIG. 4 is a flowchart regarding an image processing method of an electronic device according to various embodiments of the disclosure.

FIG. 4 is a flowchart regarding an image processing method of an electronic device according to various embodiments of the disclosure.

According to various embodiments, at operation 410, an electronic device (e.g., the electronic device 201) may drive a camera module (e.g., the camera module 291). When a user input for executing an application (e.g., the camera 376) capable of providing a camera function is received through an input device (e.g., the input device 250), for example, the electronic device may drive the camera module. When the camera module is driven, the electronic device may display a user interface for a function (e.g., a photographing function or a setting function regarding photographing) related to the camera module, for example, on a display (e.g., the display 260). For example, the electronic device may display a user interface related to a function for photographing a moving subject on the display. At this time, a user may select the function for photographing a moving subject through the interface displayed on the display. For example, the electronic device may display an interface through which an international organization for standardization (ISO) numerical value or iris numerical value related to the sensitivity of light may be adjusted on the display. The parameter numerical value (e.g., ISO numerical value or iris numerical value) related to photographing may be variously set by a processor.

The electronic device may obtain a preview image through the camera module, for example. In this case, the preview image may mean an image obtained by the electronic device using light received through the lens of the camera module before whether to photograph the subject is identified after the camera module is driven, for example. The electronic device may temporarily store an obtained preview image in a memory (e.g., the memory 230), for example. The electronic device may display the obtained preview image on the display, for example. The electronic device may obtain the preview image at a given time interval, for example. According to various embodiments, at operation 420, the electronic device may identify whether to photograph the subject through the camera module. For example, when a user selects the photographing function through a user interface displayed on the display, the electronic device may identify the photographing of the subject. The electronic device may identify whether to photograph the subject based on the preview image, for example. For example, the electronic device may compare a first preview image with a second preview image obtained right before the first preview image is obtained, and may identify the photographing of the subject based on a result of the comparison between the first preview image and the second preview image. For example, the electronic device may compare at least one object, included in the first preview image, with at least one object included in the second preview image, and may confirm a motion of the subject based on a result of the comparison. In this case, if a motion of the subject is confirmed, the electronic device may identify the photographing of the subject.

According to various embodiments, at operation 430, when the photographing of the subject is identified, the electronic device may obtain an image of the subject. The electronic device may store the obtained image in a memory (e.g., the memory 230), for example. For example, when the photographing of the subject is identified, the electronic device may receive light through the lens, and may obtain an image of the subject through an image sensor being exposed to the light. At this time, the electronic device may obtain an image of the subject by controlling the image sensor to be exposed to the light during an exposure time set for the image sensor from timing in which a user selects the photographing function. In this case, the electronic device may control the image sensor to be exposed to the light during the exposure time by including a mechanical element (e.g., a mechanical shutter) for controlling the amount of light toward the image sensor, for example, and may obtain the same result as that the image sensor is exposed to the light during the set exposure time by adjusting the time taken to extract an electrical signal from the image sensor through the processor. In the present embodiment, the electronic device may obtain a first image related to a first exposure time and may obtain a second image related to a second exposure time. The second exposure time has been illustrated as being shorter than the first exposure time, but the disclosure is not limited to the illustrative embodiment.

According to various embodiments, the electronic device may include a camera module, including a first camera module having a first lens and a second camera module having a second lens, and may include a first image sensor and second image sensor corresponding to the respective camera modules. The electronic device may independently set the time taken for the first image sensor to be exposed to light and the time taken for the second image sensor to be exposed to light with respect to the respective image sensors, for example. For example, the first image sensor may be exposed to light received through the first lens. The electronic device may obtain a first image based on light detected by the first image sensor. For example, the second image sensor may be exposed to light received through the second lens. The electronic device may obtain a second image based on light detected by the second image sensor. In this case, the electronic device may control the first image sensor and the second image sensor to be exposed to light during exposure times, respectively, set for the first image sensor and the second image sensor from timing in which a user selects the photographing function, for example, and may obtain the first image and the second image. This is described with reference to FIG. 7.

Figure 7:
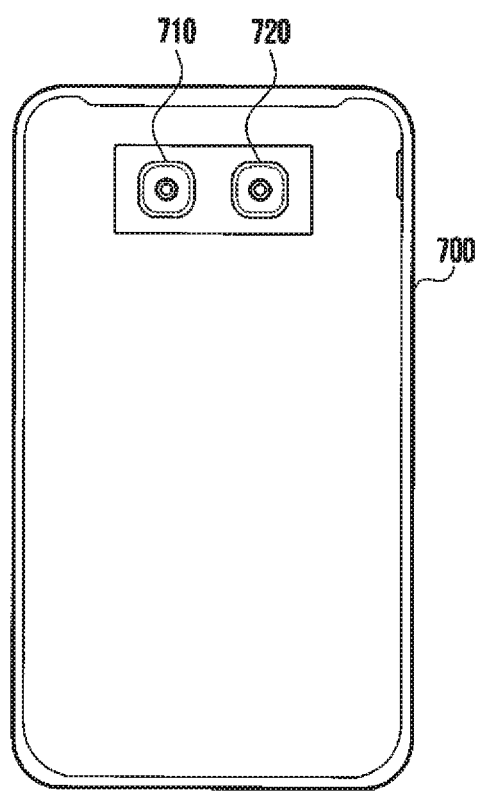
FIG. 7 is an exemplary diagram showing an electronic device including a plurality of camera modules according to various embodiments of the disclosure.

FIG. 7 is an exemplary diagram showing an electronic device including a plurality of camera modules according to various embodiments of the disclosure. Referring to FIG. 7, the first lens 710 of a first camera module and the second lens 720 of a second camera module may be disposed at the back of an electronic device 700. The electronic device 700 may obtain a first image based on light received through the first lens 710, and may obtain a second image based on light received through the second lens 720. In the present embodiment, the first lens 710 and the second lens 720 have been illustrated as being disposed at the back of the electronic device, but the disclosure is not limited to the illustrative embodiment.

According to various embodiments, an electronic device may independently set the time taken for each element, included in an image sensor, to be exposed to light with respect to each element. For example, the electronic device may identify at least one element, set as a first exposure time, as a first element group, and may identify at least one element, set as a second exposure time, as a second element group. In this case, the electronic device may obtain a first image based on light detected through the first element group, and may obtain a second image based on light detected through the second element group, for example. For example, if the first exposure time is longer than the second exposure time, an element set as the first exposure time may be identified as a long exposure element, and an element set as the second exposure time may be identified as a short exposure element. This is described with reference to FIGS. 8A and 8B.

Figure 8A:
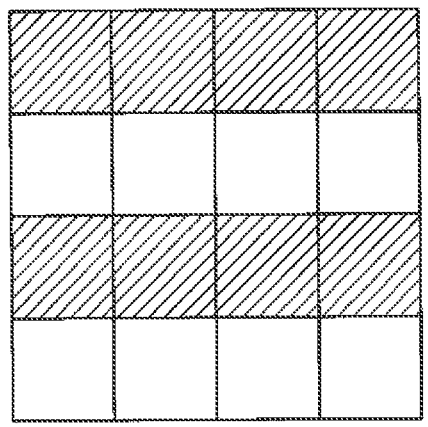
FIG. 8A is an exemplary diagram showing the pattern of elements included in an image sensor according to various embodiments of the disclosure.
Figure 8A:
Figure 8A:
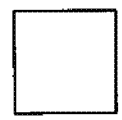
Figure 8B:
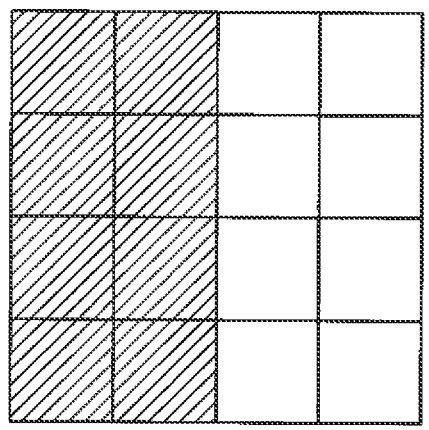
FIG. 8B is an exemplary diagram showing the pattern of elements included in an image sensor according to various embodiments of the disclosure.
Figure 8B:
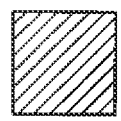
Figure 8B:

FIG. 8A is an exemplary diagram showing the pattern of elements included in an image sensor according to various embodiments of the disclosure. FIG. 8B is an exemplary diagram showing the pattern of elements included in an image sensor according to various embodiments of the disclosure.

Referring to FIG. 8A, long exposure elements 810 and short exposure elements 820 included in an image sensor 800 may be intersected and disposed in a width stripe pattern. Referring to FIG. 8B, if the elements included in the image sensor 800 are divided into two, elements on one side may be disposed as the long exposure elements 810, and elements on the other side may be disposed as the short exposure elements 820. In the present embodiment, the long exposure elements 810 and the short exposure elements 820 have been illustrated as being intersected and disposed in a width stripe pattern or as being bisected and disposed, but the disclosure is not limited to the illustrative embodiment. The long exposure elements 810 and the short exposure elements 820 may be disposed to form various types of constant patterns or irregular patterns.

According to various embodiments, at operation 440, the electronic device may extract the feature of at least one pixel included in the image obtained at operation 430. In this case, the feature of the pixel may include color, brightness, chroma, whether a motion blur has occurred, the intensity of a motion blur, the direction of a motion blur, etc., for example. In this case, the motion blur may mean a phenomenon in which the boundary of an object included in an image is blurred due to an afterimage of the subject generated because an image acquisition device is shaken or the subject moves fast at the moment when the image acquisition device obtains an image of the subject, for example. For example, if a moving subject is photographed using a camera whose exposure time is set shortly, an image having low brightness and rarely including a motion blur may be obtained because an image sensor is exposed to light for a short time. If a moving subject is photographed using a camera whose exposure time is set long, an image having high brightness, a good a signal to noise ratio (SNR), and including many motion blurs may be obtained because an image sensor is exposed to light for a long time. For example, a motion blur may less occur if a background is photographed using a camera whose exposure time is set long because the subject corresponding to the background is fixed. If a moving subject is photographed, a motion blur may occur depending on the exposure time of the camera.

The electronic device may extract the feature of at least one pixel by comparing at least one pixel included in an image with at least one peripheral pixel neighboring a given range from the at least one pixel, for example. For example, the electronic device may identify a motion blur for at least one pixel by comparing the at least one pixel included in an image with at least one peripheral pixel neighboring a given range from the at least one pixel. The electronic device may calculate at least any one of the intensity or direction of a motion blur for at least one pixel, for example. According to various embodiments, the electronic device may use various known methods in order to calculate at least one of the intensity and direction of a motion blur for at least one pixel.

According to various embodiments, the electronic device may segment an image into at least one region, including at least one pixel, based on the similarity of features between neighboring pixels. For example, the electronic device may segment an image into at least one region using a superpixel segmentation method. The electronic device may calculate at least any one of the intensity or direction of a motion blur for at least one region, for example.

According to various embodiments, at operation 450, the electronic device may compare at least one pixel included in the first image with at least one pixel included in the second image. The electronic device may identify at least one pixel included in the second image and corresponding to at least one pixel included in the first image, for example, and may compare the feature of at least one pixel included in the first image with the feature of at least one pixel included in the second image and corresponding to the at least one pixel included in the first image. For example, the electronic device may compare the intensity and direction of a motion blur for at least one pixel included in the first image with the intensity and direction of a motion blur for at least one pixel included in the second image and corresponding to the at least one pixel included in the first image. Furthermore, for example, if a difference between the intensity and direction of a motion blur for at least one pixel included in the first image and the intensity and direction of a motion blur for at least one pixel included in the second image and corresponding to the at least one pixel included in the first image, is a given reference or more, the electronic device may identify the at least one pixel included in the second image as a pixel related to the moving subject. If the difference is the given reference or less, the electronic device may identify the at least one pixel included in the second image as a pixel not related to a moving subject. In this case, the given reference may mean a tolerance limit by which the feature of the at least one pixel included in the first image and the feature of the at least one pixel included in the second image may be identified to be the same.

For example, the electronic device may compare at least one region, including at least one pixel included in the first image, with at least one region including at least one pixel included in the second image and corresponding to the at least one pixel included in the first image.

For example, if the electronic device includes a first lens and a second lens, obtains a first image using a first image sensor corresponding to the first lens, and obtains a second image using a second image sensor corresponding to the second lens, the location of the subject included in the first image and the location of the subject included in the second image may be different. In this case, the electronic device may calculate a motion vector between the location of the subject included in the first image and the location of the subject included in the second image, for example, and may enable the subject included in the first image and the subject included in the second image to be aligned based on the calculated motion vector. In this case, the motion vector may mean a direction and distance between the location of the subject included in the first image and the location of the subject included in the second image, for example. This is described with reference to FIGS. 9A to 9C.

Figure 9A:
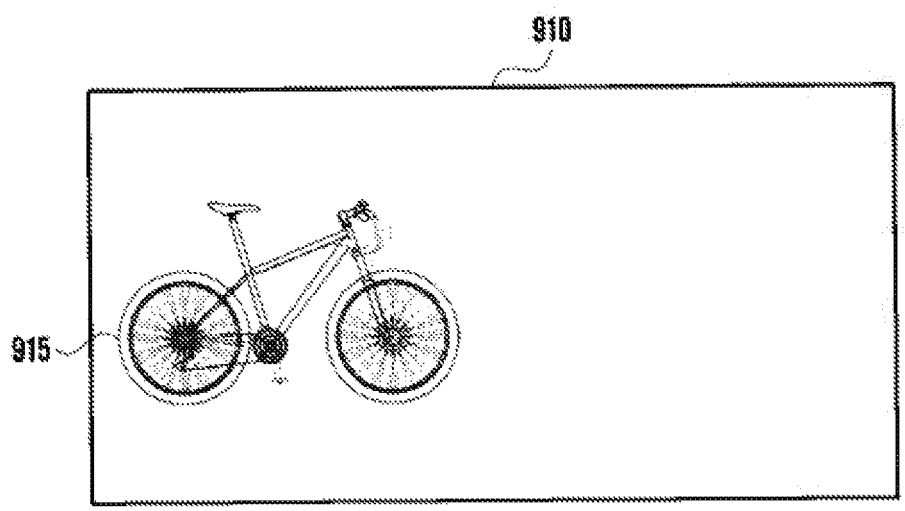
FIG. 9A is an exemplary diagram conceptually showing a first image according to various embodiments of the disclosure.
Figure 9B:
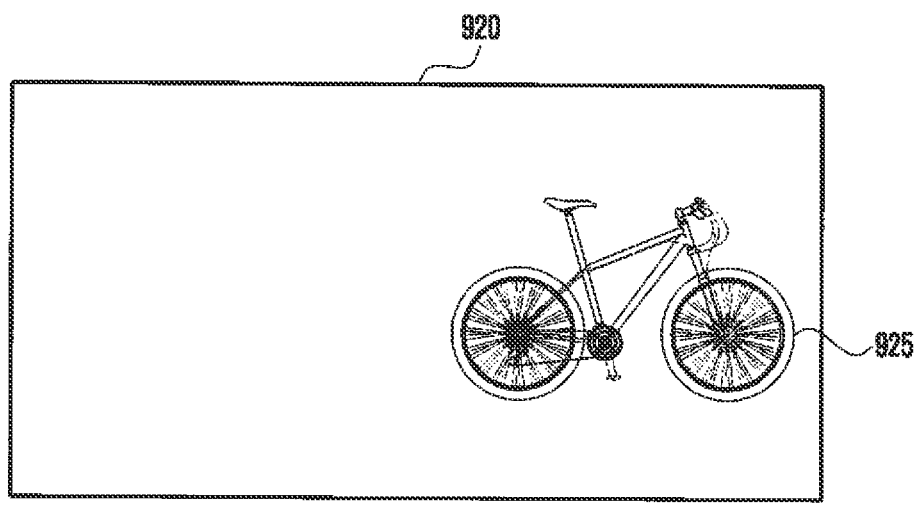
FIG. 9B is an exemplary diagram conceptually showing a second image according to various embodiments of the disclosure.
Figure 9C:
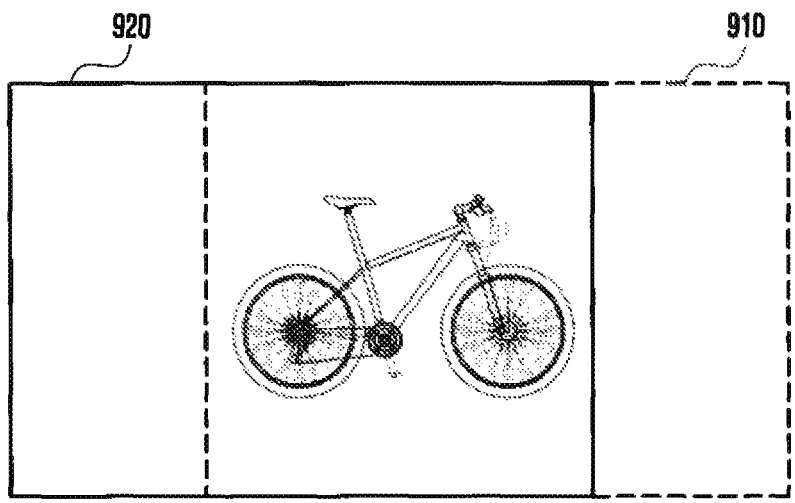
FIG. 9C is an exemplary diagram conceptually showing that the subject included in the first image and the subject included in the second image have been matched up according to various embodiments of the disclosure.

FIG. 9A is an exemplary diagram conceptually showing a first image according to various embodiments of the disclosure. FIG. 9B is an exemplary diagram conceptually showing a second image according to various embodiments of the disclosure. FIG. 9C is an exemplary diagram conceptually showing that the subject included in the first image and the subject included in the second image have been matched up according to various embodiments of the disclosure.

Referring to FIGS. 9A, 9B and 9C, if an electronic device including a first lens and a second lens photographs the subject (e.g., bicycle), a subject 915 included in a first image 910 may be positioned on the left of the first image, and a subject included in a second image 925 may be positioned on the right of the second image. In this case, the location (e.g., coordinate value) of the subject 915 included in the first image 910 and the location of the subject 925 included in the second image are different. Accordingly, the location of at least one pixel related to a bicycle included in the first image 910 and the location of at least one pixel related to a bicycle included in the second image 920 and corresponding to the at least one pixel related to the bicycle included in the first image 910 may be different.

In this case, the electronic device may identify at least one pixel related to the bicycle, included in the second image 920 and corresponding to the at least one pixel related to the bicycle included in the first image 910, based on the feature of the at least one pixel related to the bicycle included in the first image 910 and the feature of the at least one pixel related to the bicycle included in the second image 920. Furthermore, the electronic device may calculate a motion vector between the location of the at least one pixel related to the bicycle included in the first image 910 and the location of the at least one pixel related to the bicycle included in the second image 920, for example, and may enable the at least one pixel included in the first image 910 and the at least one pixel included in the second image 920 to be aligned based on the calculated motion vector.

According to various embodiments, at operation 460, the electronic device may process the second image related to a second exposure time shorter than a first exposure time. According to various embodiments, the electronic device may identify a mode related to image processing. For example, if the electronic device processes at least one pixel related to a moving subject, it may identify the mode as a mode in which the at least one pixel related to the moving subject is processed (hereinafter "subject processing mode"). If the electronic device processes at least one pixel not related to a moving subject (e.g., pixel related to the background), it may identify the mode as a mode in which the at least one pixel not related to the moving subject (e.g., pixel related to the background) is processed (hereinafter "background processing mode"). In this case, the electronic device may process any one of the at least one pixel related to the moving subject and at least one pixel not related to the moving subject (e.g., pixel related to the background), included in the second image, based on a mode related to image processing, for example. The electronic device may display a user interface through which a mode related to image processing may be selected on a display, for example, and may process the second image based on a mode selected by a user.

According to various embodiments, the electronic device may process at least one pixel included in the second image based on the intensity and direction of a motion blur for at least one pixel included in the first image. For example, a panning shot effect may be applied to at least one pixel included in the second image in proportion to a difference between the intensity of a motion blur for at least one pixel included in the first image and the intensity of a motion blur for the at least one pixel, included in the second image and corresponding to the at least one pixel included in the first image. For example, if a panning shot effect is applied to at least one pixel included in the second image, the electronic device may apply the panning shot effect to the at least one pixel included in the second image in the direction identical with or opposite the direction of a motion blur for at least one pixel, included in the first image and corresponding to the at least one pixel included in the second image, based on the direction of a motion blur.

Figure 5:
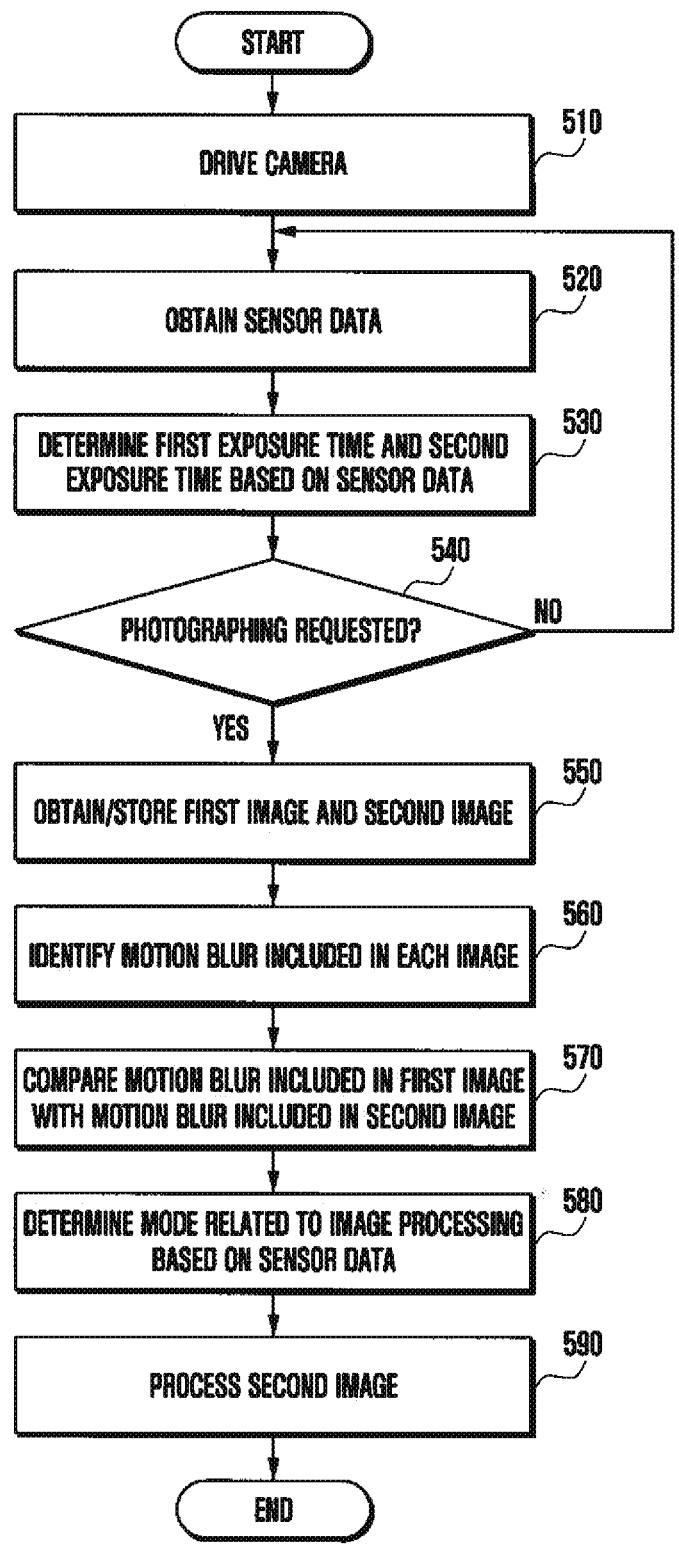
FIG. 5 is a flowchart regarding an image processing method of an electronic device according to various embodiments of the disclosure.

FIG. 5 is a flowchart regarding an image processing method of an electronic device according to various embodiments of the disclosure. A detailed description of contents redundant with the contents described with reference to FIG. 4 is omitted.

According to various embodiments, at operation 510, the electronic device may drive a camera module. For example, when a user input for executing an application capable of providing a camera function is received through an input device, the electronic device may drive the camera module. When the camera module is driven, the electronic device may display, on a display, a user interface for a function related to the camera module, for example. The electronic device may obtain a preview image through the camera module, for example.

According to various embodiments, at operation 520, the electronic device may obtain data (hereinafter "sensor data") from a sensor module. The electronic device may obtain data related to a motion of the electronic device, for example, through the sensor module. For example, the electronic device may obtain data related to angular speed for a motion of the electronic device using a gyro sensor. The electronic device may obtain data related to a surrounding environment of the electronic device, for example, through a sensor module. For example, the electronic device may calculate the illuminance of a surrounding environment using an illuminance sensor.

According to various embodiments, at operation 530, the electronic device may determine an exposure time for an image sensor based on the sensor data.

According to various embodiments, the electronic device may identify the exposure time for the image sensor based on data obtained through a gyro sensor.

For example, if an angle of view for the horizontal direction of a lens included in the electronic device is 90 degrees and the number of pixels in the horizontal direction of an image is 1800, one pixel in the horizontal direction of the image may correspond to an angle of view of 0.05 degree. In this case, if the electronic device identifies that a motion blur occurs when a color that needs to be displayed in one pixel included in the image is displayed by exceeding two pixels, the electronic device may identify the time for which an object moves 0.1 degree with respect to the horizontal direction as a maximum exposure time for which a motion blur does not occur in the image. For example, if angular speed for the horizontal direction of the electronic device, calculated using a gyro sensor, is 360 degrees per second, the electronic device may identify a maximum exposure time for which a motion blur does not occur in an image as $1/3600$ second. For example, if a maximum exposure time for which a motion blur does not occur in an image is identified as $1/3600$ second, the electronic device may set a first exposure time to exceed $1/3600$ second and set a second exposure time to exceed $1/3600$ second or less so that a motion blur occurs in a first image related to the first exposure time and a motion blur does not occur in a second image related to the second exposure time shorter than the first exposure time. For example, in order for a color to be displayed in one pixel to be displayed in 6 pixels or more of the first image, the electronic device may set the first exposure time to exceed $1/1200$ second.

According to various embodiments, the electronic device may identify an exposure time for an image sensor based on a preview image. For example, the electronic device may compare a first preview image before the photographing of the subject is identified with a second preview image right before the first preview image is obtained. In this case, the electronic device may calculate information (e.g., moving direction, speed, etc. of the subject) related to a motion of the subject based on the location of objects included in the preview images and the time taken to obtain the preview images, and may identify an exposure time for an image sensor based on the calculated information. For example, the electronic device may identify that a motion blur occurs when a color to be displayed in one pixel included in an image is displayed by exceeding two pixels. In this case, if the interval between the time taken to obtain the first preview image and the time taken to obtain the second preview image is 0.1 second and the subject has been identified as having moved 720 pixels during 0.1 second based on a result of the comparison between the first preview image and the second preview image, the electronic device may identify a maximum exposure time for which a motion blur does not occur in the image as $1/3600$ second.

According to various embodiments, at operation 540, the electronic device may identify whether to photograph the subject through a camera module. For example, if a user selects a photographing function through a user interface displayed on a display, the electronic device may identify the photographing of the subject.

At operation 540, for example, if the photographing of the subject is not identified, the electronic device branches to operation 520, may obtain sensor data, and may set an exposure time based on the obtained sensor data. For example, if a user does not select a photographing function for a given time, the electronic device may branch to operation 520.

According to various embodiments, if the photographing of the subject is identified, the electronic device may obtain an image of the subject at operation 550. The electronic device may store the obtained image in a memory, for example. For example, if the photographing of the subject is identified, the electronic device may receive light through a lens, and may obtain an image of the subject based on an image sensor being exposed to light. In this case, the electronic device may obtain an image of the subject by controlling the image sensor to be exposed to light during an exposure time set for the image sensor from timing in which a user selects a photographing function.

According to various embodiments, the electronic device may include a first lens and a second lens, and may include a first image sensor and a second image sensor corresponding to the respective lenses. For example, the first image sensor may be exposed to light received through the first lens, and the electronic device may obtain a first image based on the light detected by the first image sensor. For example, the second image sensor may be exposed to light received through the second lens, and the electronic device may obtain a second image based on the light detected by the second image sensor. In this case, the electronic device may control the first image sensor and the second image sensor to be exposed to light during exposure times, set for the first image sensor and the second image sensor, respectively, from timing in which a user selects a photographing function, for example, and may obtain the first image and the second image.

According to various embodiments, the electronic device may independently set the time for which each element included in an image sensor is exposed to light with respect to each element. For example, the electronic device may identify at least one element, set as a first exposure time, as a first element group, and may identify at least one element, set as a second exposure time, as a second element group. In this case, the electronic device may obtain a first image based on light detected through the first element group and obtain a second image based on light detected through the second element group, for example. For example, if the first exposure time is longer than the second exposure time, an element set as the first exposure time may be identified as a long exposure element, and an element set as the second exposure time may be identified as a short exposure element.

According to various embodiments, at operation 560, the electronic device may extract the feature of at least one pixel included in each image obtained at operation 550. For example, the electronic device may extract the feature of at least one pixel by comparing at least one pixel, included in an image, with at least one peripheral pixel neighboring a given range from the at least one pixel. For example, the electronic device may identify a motion blur for at least one pixel by comparing at least one pixel included in an image with at least one peripheral pixel that neighbors a given range from the at least one pixel. For example, the electronic device may calculate at least any one of the intensity or direction of a motion blur for the at least one pixel.

According to various embodiments, the electronic device may segment an image into at least one region including at least one pixel, based on the similarity of features between neighboring pixels.

According to various embodiments, at operation 570, the electronic device may compare at least one pixel included in the first image with at least one pixel included in the second image. For example, the electronic device may identify at least one pixel included in the second image and corresponding to at least one pixel included in the first image, and may compare the feature of the at least one pixel, included in the first image, with the feature of at least one pixel included in the second image that corresponds to the at least one pixel included in the first image. For example, the electronic device may compare the intensity and direction of a motion blur for at least one pixel included in the first image with the intensity and direction of a motion blur for at least one pixel included in the second image and corresponding to the at least one pixel included in the first image. Furthermore, for example, if a difference between the intensity and direction of a motion blur for at least one pixel included in the first image and the intensity and direction of a motion blur for at least one pixel included in the second image that corresponds to at least one pixel included in the first image, is more than a given reference, the electronic device may identify the at least one pixel, included in the second image, as a pixel related to a moving subject. If the difference is the given reference or less, the electronic device may identify the at least one pixel, included in the second image, as a pixel not related to a moving subject.

According to various embodiments, at operation 580, the electronic device may determine a mode related to image processing based on sensor data.

For example, if it is identified that the electronic device is fixed based on data obtained through a gyro sensor, the electronic device may identify the mode as a subject processing mode. If it is identified that the electronic device is not fixed based on data obtained through a gyro sensor, the electronic device may identify the mode as a background processing mode. For example, the electronic device may display a user interface through which a mode related to image processing may be selected on a display, and may identify a mode related to image processing based on a mode selected by a user.

According to various embodiments, at operation 590, the electronic device may process the second image related to the second exposure time shorter than the first exposure time. In this case, the electronic device may process any one of at least one pixel related to a moving subject included in the second image and at least one pixel not related to a moving subject based on the mode related to image processing, for example.

According to various embodiments, the electronic device may process at least one pixel included in the second image based on the intensity and direction of a motion blur for at least one pixel included in the first image. For example, the electronic device may apply a panning shot effect to at least one pixel included in the second image, based on a difference between the intensity of a motion blur for at least one pixel included in the first image and the intensity of a motion blur for the at least one pixel included in the second image that corresponds to the at least one pixel included in the first image. For example, if a panning shot effect is applied to at least one pixel included in the second image, the electronic device may apply the panning shot effect to the at least one pixel included in the second image, based on the direction of a motion blur for at least one pixel included in the first image that corresponds to the at least one pixel included in the second image.

Figure 6:
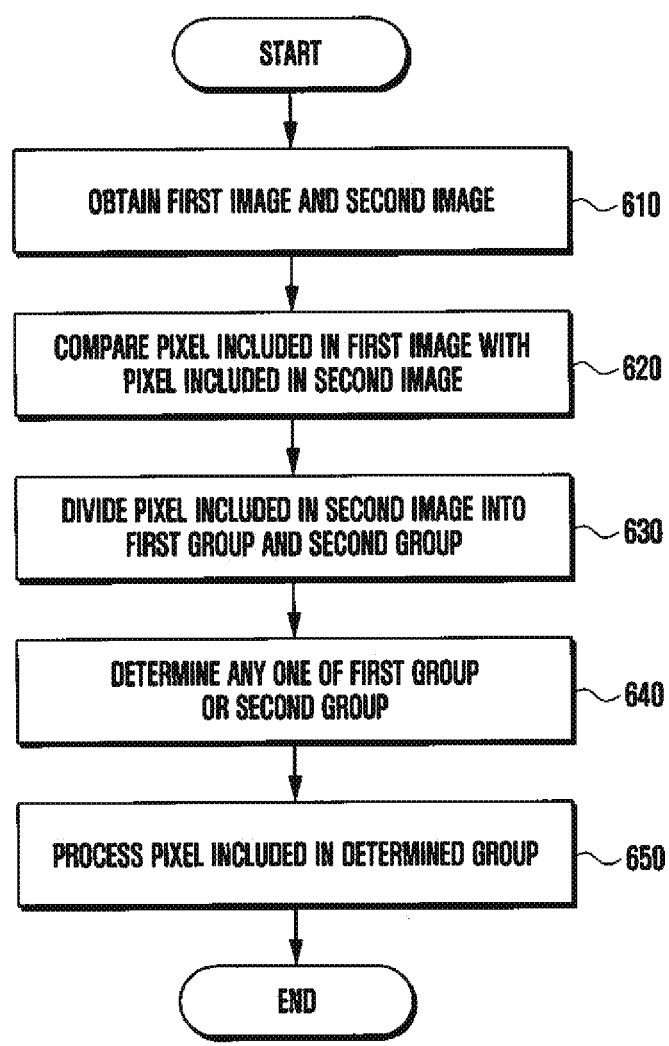
FIG. 6 is a flowchart regarding an image processing method of an electronic device according to various embodiments of the disclosure.

FIG. 6 is a flowchart regarding an image processing method of an electronic device according to various embodiments of the disclosure. A detailed description of contents redundant with the contents described with reference to FIGS. 4 and 5 is omitted.

According to various embodiments, at operation 610, an electronic device (e.g., the electronic device 201) may obtain an image of the subject through a camera module (e.g., the camera module 291). For example, the electronic device may receive light through a lens included in the camera module, and may obtain an image of the subject based on the image sensor being exposed to the light.

For example, the electronic device may include a first camera module including a first lens and a second camera module including a second lens, and may include a first image sensor and a second image sensor corresponding to the respective camera modules. For example, the first image sensor may be exposed to light received through the first lens, and the electronic device may obtain a first image based on the light detected by the first image sensor. For example, the second image sensor may be exposed to light received through the second lens, and the electronic device may obtain a second image based on the light detected by the second image sensor.

For example, the electronic device may independently set the time for which each element included in the image sensor is exposed to light with respect to each element. For example, the electronic device may identify at least one element, set as a first exposure time, as a first element group, and may identify at least one element, set as a second exposure time, as a second element group. In this case, for example, the electronic device may obtain a first image based on light detected through the first element group, and may obtain a second image based on light detected through the second element group.

According to various embodiments, at operation 620, the electronic device may compare at least one pixel included in the first image with at least one pixel included in the second image.

For example, the electronic device may extract the feature of at least one pixel included in the image obtained at operation 610. For example, the electronic device may extract the feature of at least one pixel by comparing the at least one pixel, included in an image, with at least one peripheral pixel neighboring a given range from the at least one pixel.

For example, the electronic device may identify at least one pixel included in the second image and corresponding to at least one pixel included in the first image, and may compare the feature of the at least one pixel included in the first image with the feature of the at least one pixel included in the second image and corresponding to the at least one pixel included in the first image.

According to various embodiments, at operation 630, the electronic device may divide at least one pixel, included in the second image, into a plurality of groups. For example, the electronic device may classify at least one pixel related to a moving subject, included in the second image, as a first group and classify at least one pixel not related to a moving subject (e.g., a pixel related to a background), included in the second image, as a second group based on a result of a comparison between the at least one pixel included in the first image and the at least one pixel included in the second image.

According to various embodiments, at operation 640, the electronic device may determine any one of the first group and the second group. For example, if a mode related to image processing is a subject processing mode, the electronic device may identify the first group of the first group and the second group. If a mode related to image processing is a background processing mode, the electronic device may identify the second group of the first group and the second group.

According to various embodiments, at operation 650, the electronic device may process a pixel included in the group identified at operation 640. For example, the electronic device may apply a panning shot effect to at least one pixel included in the first group or the second group.

Figure 10A:
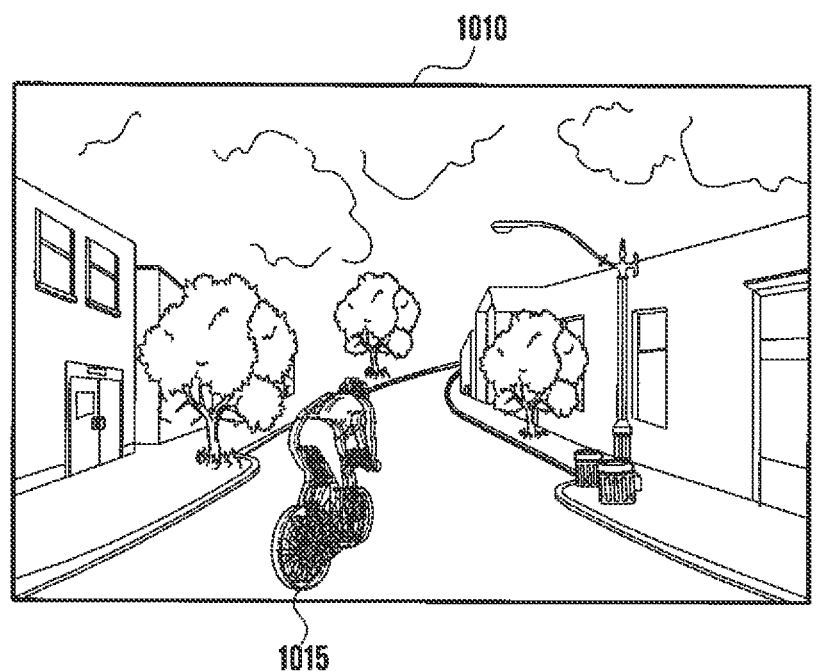
FIG. 10A is an exemplary diagram conceptually showing a first image related to a first exposure time according to various embodiments of the disclosure.
Figure 10B:
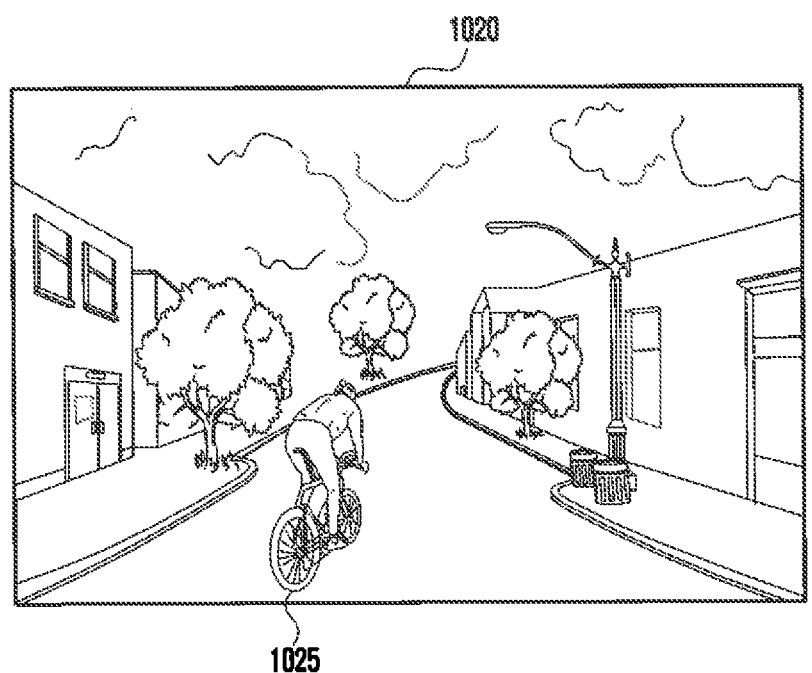
FIG. 10B is an exemplary diagram conceptually showing a second image related to a second exposure time shorter than the first exposure time according to various embodiments of the disclosure.
Figure 10C:
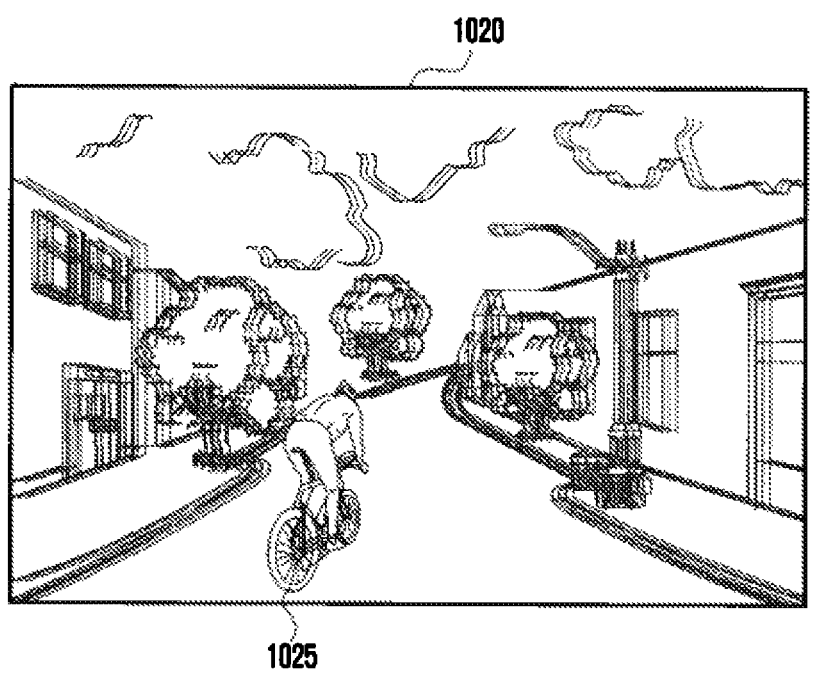
FIG. 10C is an exemplary diagram conceptually showing the second image on which a panning shot effect has been processed according to various embodiments of the disclosure.

FIG. 10A is an exemplary diagram conceptually showing a first image related to a first exposure time according to various embodiments of the disclosure. FIG. 10B is an exemplary diagram conceptually showing a second image related to a second exposure time shorter than the first exposure time according to various embodiments of the disclosure. FIG. 10C is an exemplary diagram conceptually showing the second image on which a panning shot effect has been processed according to various embodiments of the disclosure.

Referring to FIG. 10A, if the electronic device obtains a first image 1010 using a first image sensor set as a first exposure time that is sufficiently long to the extent that a motion blur may occur, a moving subject 1015 (e.g., bicycle) included in the first image 1010 may be blurredly displayed because a motion blur occurs. The subject (e.g., a background) except the moving subject 1015 may be clearly displayed because a motion blur does not occur.

Referring to FIG. 10B, if the electronic device obtains a second image 1020 using a second image sensor set as a second exposure time that is sufficiently short to the extent that a motion blur does not occur, a moving subject 1025 (e.g., bicycle) and background included in the second image 1020 may be clearly displayed because a motion blur does not occur.

Referring to FIG. 10C, the electronic device may process a panning shot effect on a pixel related to the background, included in the second image 1020, based on a mode related to image processing.

For example, if a user selects the background as a region in which an image will be processed through a user interface displayed on a display, the electronic device may identify a mode related to image processing as a background processing mode, and may process a panning shot effect on at least one pixel related to the background included in the second image 1020. For example, if it is identified that the electronic device is not fixed based on data obtained through a gyro sensor, the electronic device may identify a mode related to image processing as a background processing mode, and may process a panning shot effect on a pixel related to the background included in the second image 1020.

Figure 11A:
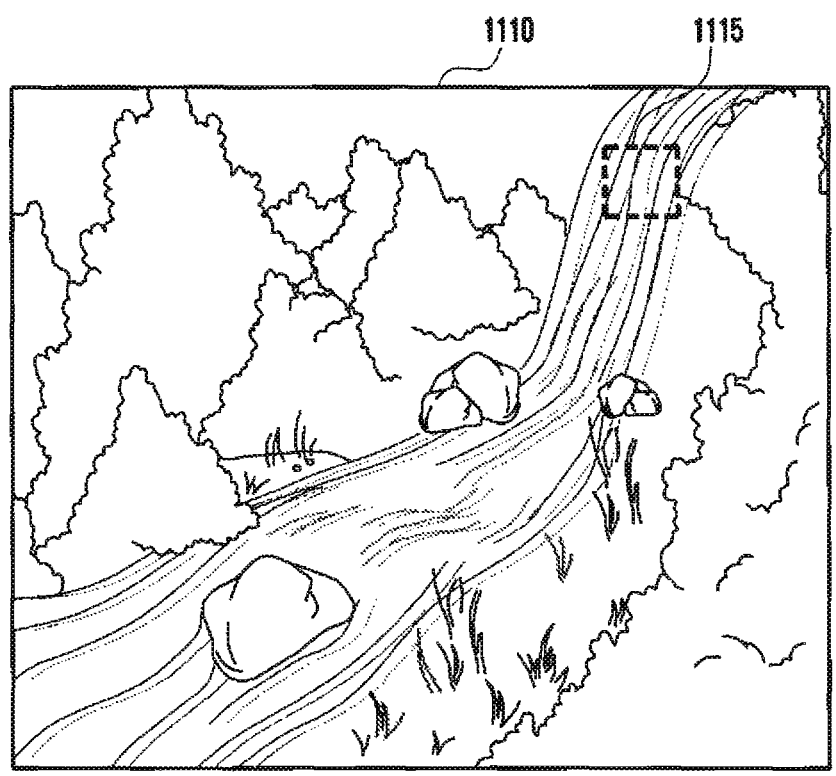
FIG. 11A is an exemplary diagram conceptually showing a first image related to a first exposure time according to various embodiments of the disclosure.
Figure 11B:
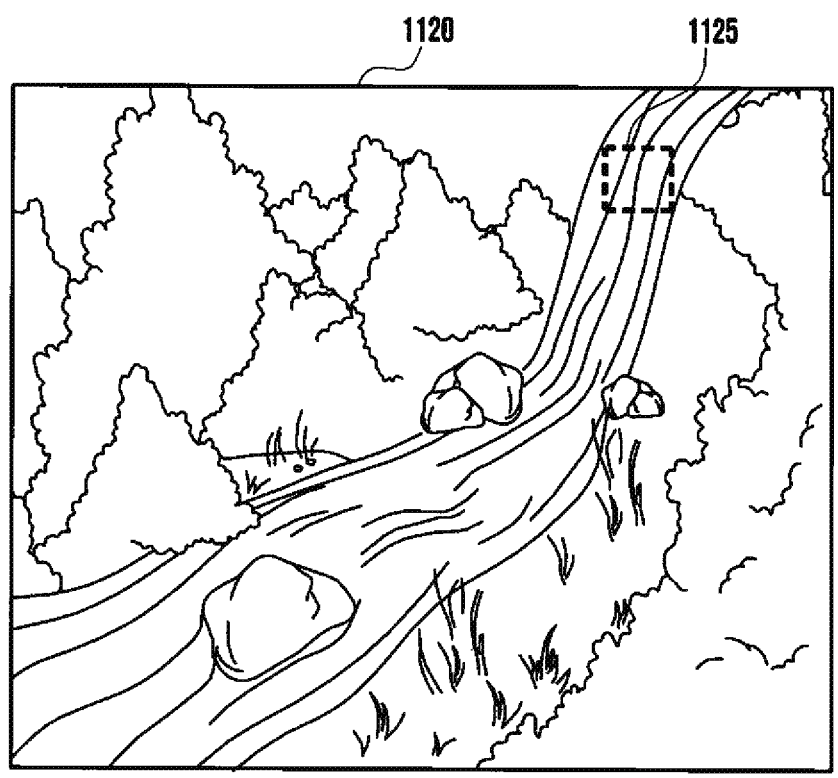
FIG. 11B is an exemplary diagram conceptually showing a second image related to a second exposure time shorter than the first exposure time according to various embodiments of the disclosure.
Figure 11C:
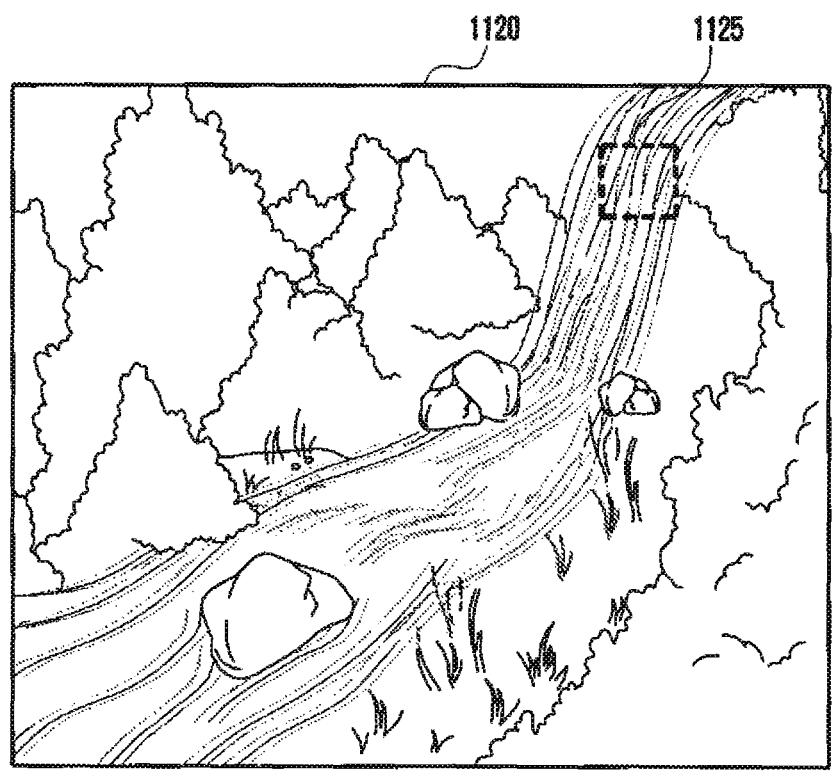
FIG. 11C is an exemplary diagram conceptually showing the second image on which a panning shot effect has been processed according to various embodiments of the disclosure.

FIG. 11A is an exemplary diagram conceptually showing a first image related to a first exposure time according to various embodiments of the disclosure. FIG. 11B is an exemplary diagram conceptually showing a second image related to a second exposure time shorter than the first exposure time according to various embodiments of the disclosure. FIG. 11C is an exemplary diagram conceptually showing the second image on which a panning shot effect has been processed according to various embodiments of the disclosure.

Referring to FIG. 11A, if the electronic device obtains a first image 1110 using a first image sensor set as a first exposure time that is sufficiently long to the extent that a motion blur may occur, a moving subject 1115 (e.g., the stream of water) included in the first image 1110 may be blurredly displayed because a motion blur occurs. A stopped subject (e.g., the background) except the moving subject 1115 may be clearly displayed because a motion blur does not occur.

Referring to FIG. 11B, if the electronic device obtains a second image 1120 using a second image sensor set as a second exposure time that is sufficiently short to the extent that a motion blur does not occur, a moving subject 1125 (e.g., the stream of water) and the background included in the second image 1120 may be clearly displayed because a motion blur does not occur.

Referring to FIG. 11C, the electronic device may process a panning shot effect on at least one pixel (e.g., a pixel related to the stream of water) related to the moving subject 1125 included in the second image 1120, based on a mode related to image processing.

For example, if a user selects the stream of water as a region in which an image will be processed through a user interface displayed on a display, the electronic device may identify a mode related to image processing as a subject processing mode, and may process a panning shot effect on at least one pixel related to the moving subject 1125 included in the second image 1120. For example, if it is determined that the electronic device is fixed based on data obtained through a gyro sensor, the electronic device may identify a mode related to image processing as a subject processing mode, and may process a panning shot effect on at least one pixel related to the moving subject 1125 included in the second image 1120.

The embodiments of the disclosure disclosed in the specification and drawings have merely presented specific examples in order to easily describe the technological contents of the disclosure and to help understanding of the disclosure, but are not intended to limit the scope of the disclosure. Accordingly, the scope of the disclosure should be construed as including all changes or modified forms derived based on the technical spirit of the disclosure in addition to the disclosed embodiments.

The invention claimed is:

1. An electronic device, comprising:
   a camera module; and
   a processor, wherein the processor is configured to:
   obtain a signal related to photographing,
   obtain a first image related to a first exposure time and a second image related to a second exposure time shorter than the first exposure time by one photographing through the camera module in response to the signal,
   compare at least one pixel included in the first image with at least one pixel included in the second image and corresponding to the at least one pixel included in the first image by:
      identifying a feature of the at least one pixel included in the first image by comparing the at least one pixel included in the first image with at least one peripheral pixel neighboring the at least one pixel included in the first image,
      identifying a feature of the at least one pixel included in the second image by comparing the at least one pixel included in the second image with at least one peripheral pixel neighboring the at least one pixel included in the second image, and
      comparing the feature of the at least one pixel included in the first image with the feature of the at least one pixel included in the second image and corresponding to the at least one pixel included in the first image,
   divide the at least one pixel included in the second image into a first group and a second group based on a result of the comparison,
   identify any one of the first group and the second group, and
   process at least one pixel included in the identified group, and
   wherein the feature comprises at least any one of intensity or direction of a motion blur for at least one pixel.

2. The electronic device of claim 1, wherein the processor is configured to process the at least one pixel included in the second image and corresponding to the at least one pixel included in the first image, based on at least any one of intensity or direction of a motion blur for the at least one pixel included in the first image.

3. The electronic device of claim 1, wherein the processor is configured to:
   identify a mode related to processing of the at least one pixel,
   identify the first group if the mode related to the processing of the at least one pixel is a first mode, and
   identify the second group if the mode related to the processing of the at least one pixel is a second mode.

4. The electronic device of claim 3, further comprising a sensor module,
   wherein the processor is configured to identify the mode related to the processing of the at least one pixel as any one of the first mode or the second mode based on data obtained through the sensor module.

5. The electronic device of claim 1, further comprising a sensor module,
   wherein the processor is configured to identify at least any one of the first exposure time or the second exposure time based on data obtained through the sensor module.

6. The electronic device of claim 1, wherein:
   the camera module comprises a first camera module including a first image sensor and a second camera module including a second image sensor, and
   the processor is configured to:
   identify an exposure time of the first image sensor as the first exposure time,
   identify an exposure time of the second image sensor as the second exposure time,
   obtain the first image through the first image sensor, and
   obtain the second image through the second image sensor.

7. The electronic device of claim 1, wherein:
   the camera module comprises an image sensor comprising a first element group and a second element group, and
   the processor is configured to:
   identify an exposure time of the first element group as the first exposure time,
   identify an exposure time of the second element group as the second exposure time,
   obtain the first image using the first element group, and
   obtain the second image using the second element group.

8. The electronic device of claim 1, wherein the processor is configured to:
   obtain a first preview image and a second preview image through the camera module before the signal related to photographing is received,
   compare at least one object included in the first preview image with at least one object included in the second preview image, and identify at least any one of the first exposure time or the second exposure time based on a result of the comparison.

9. A communication connection method using a voice in an electronic device, the method comprising:
receiving a signal related to photographing;
obtaining a first image related to a first exposure time and a second image related to a second exposure time shorter than the first exposure time by one photographing through the camera module in response to the signal,
comparing at least one pixel included in the first image with at least one pixel included in the second image and corresponding to the at least one pixel included in the first image,
dividing the at least one pixel included in the second image into a first group and a second group based on a result of the comparison,
identifying any one of the first group and the second group, and
processing at least one pixel included in the identified group,
wherein comparing at least one pixel included in the first image with at least one pixel included in the second image and corresponding to the at least one pixel included in the first image comprises:
identifying a feature of the at least one pixel included in the first image by comparing the at least one pixel included in the first image with at least one peripheral pixel neighboring the at least one pixel included in the first image,
identifying a feature of the at least one pixel included in the second image by comparing the at least one pixel included in the second image with at least one peripheral pixel neighboring the at least one pixel included in the second image, and
comparing the feature of the at least one pixel included in the first image with the feature of the at least one pixel included in the second image and corresponding to the at least one pixel included in the first image, and
wherein the feature comprises at least any one of intensity or direction of a motion blur for at least one pixel.

10. The method of claim 9, wherein processing at least one pixel included in the identified group further comprises processing the at least one pixel included in the second image and corresponding to the at least one pixel included in the first image, based on at least any one of intensity or direction of a motion blur for the at least one pixel included in the first image.

11. The method of claim 9, wherein identifying any one of the first group and the second group comprises:
identifying a mode related to processing of the at least one pixel,
identifying the first group if the mode related to the processing of the at least one pixel is a first mode, and
identifying the second group if the mode related to the processing of the at least one pixel is a second mode.

* * * * *